3,452,418
GATE FOR AN AUTOMATED FASTENER PRESS
Richard B. Ernest, Richboro, and Kenneth A. Swanstrom and Richard M. Davenport, Doylestown, Pa., assignors to Penn Engineering and Manufacturing Corporation, Doylestown, Pa., a corporation of Delaware
Filed Mar. 8, 1967, Ser. No. 621,678
Int. Cl. B23p 23/04
U.S. Cl. 29—211                                7 Claims

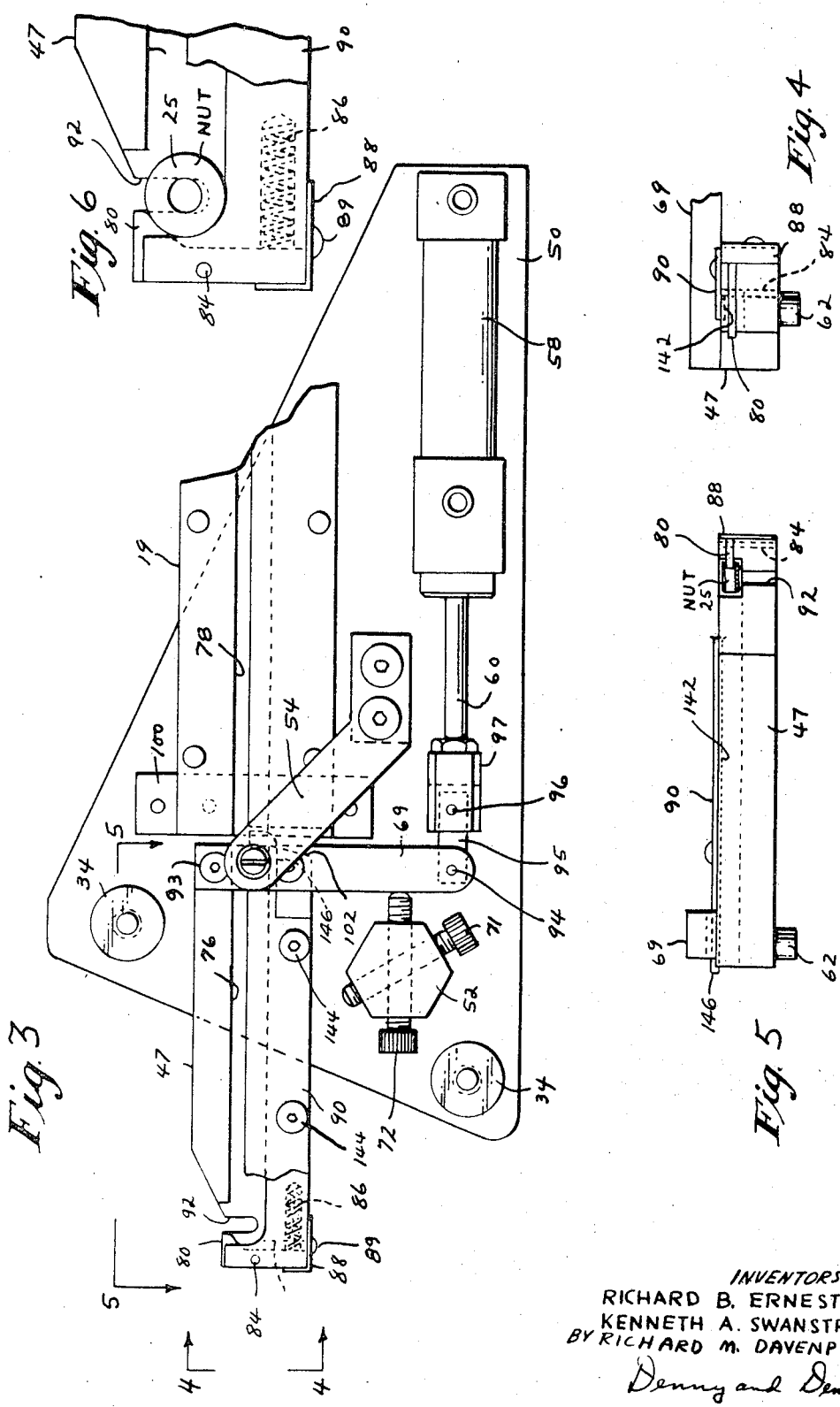

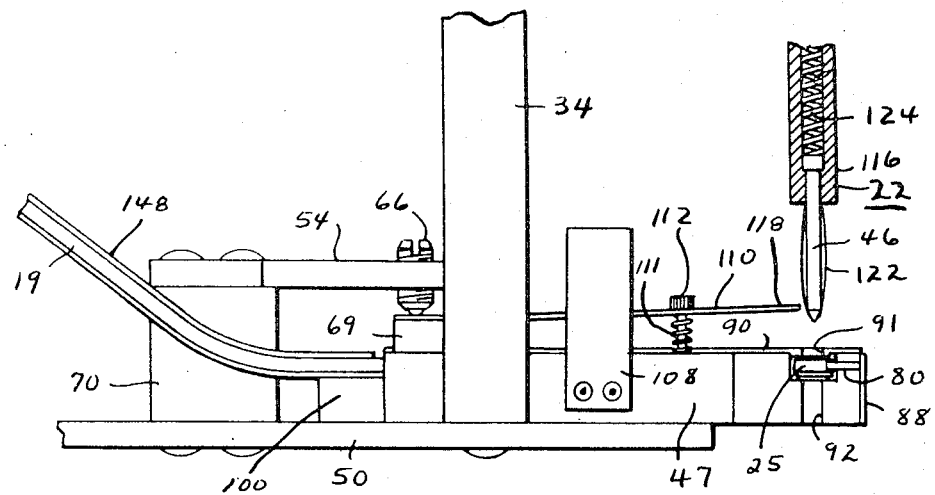
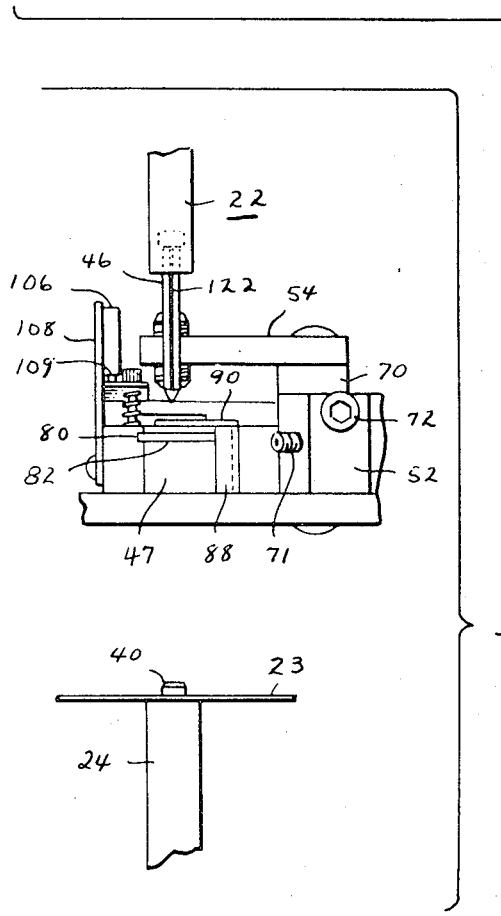
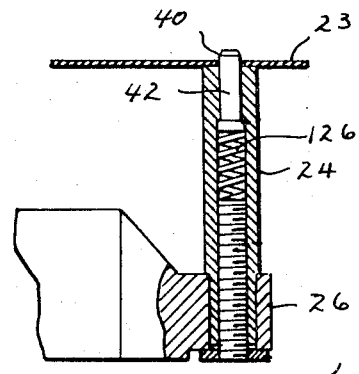
Fig. 8
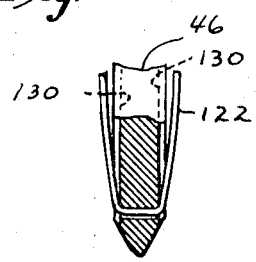
Fig. 9
Fig. 7
INVENTORS.
RICHARD B. ERNEST
KENNETH A. SWANSTROM
RICHARD M. DAVENPORT
BY
Denny and Denny
THEIR ATTORNEYS.

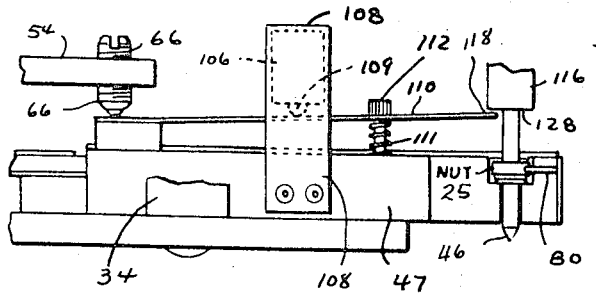
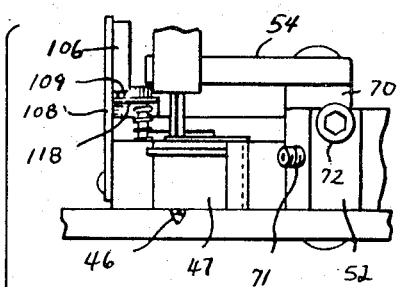
Fig. 10
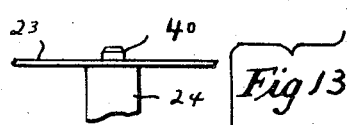
Fig. 13
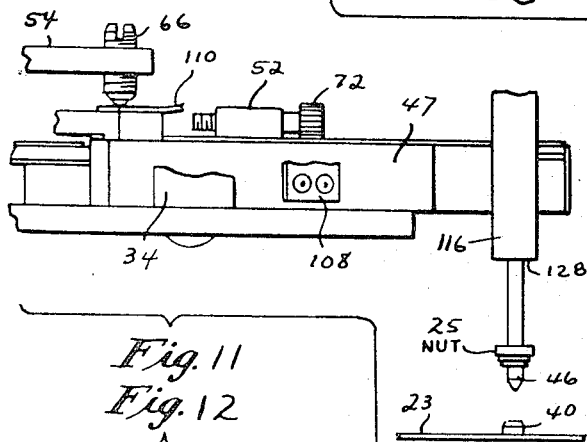
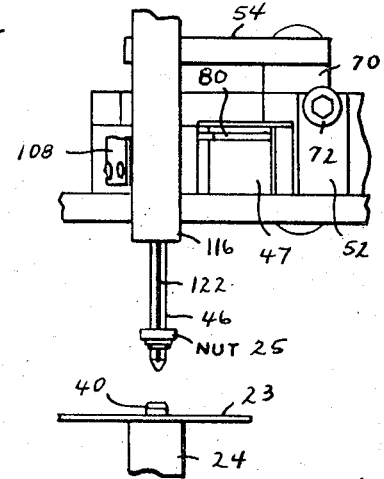
Fig. 11
Fig. 12
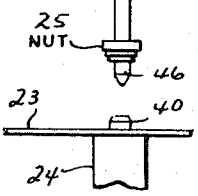
Fig. 14
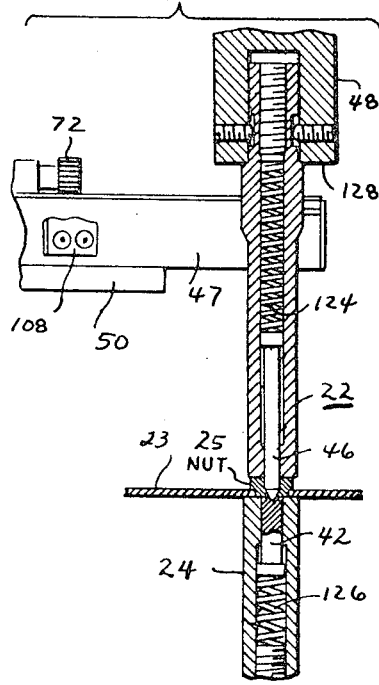
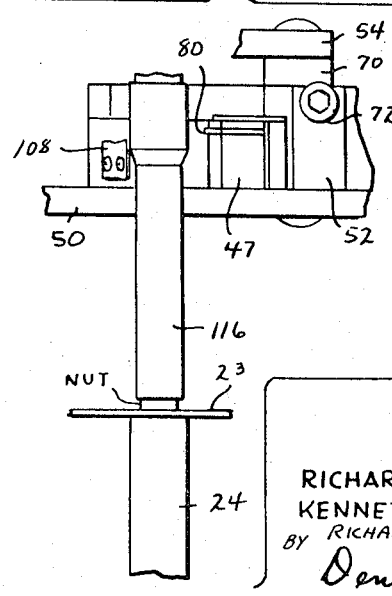
Fig. 15
INVENTORS.
RICHARD B. ERNEST
KENNETH A. SWANSTROM
BY RICHARD M. DAVENPORT
Denny and Denny
THEIR ATTORNEYS United States Patent Office 3,452,418
Patented July 1, 1969

ABSTRACT OF THE DISCLOSURE

This invention relates to a faster feeding mechanism for use in an automated press for semi-automatically installing self-clinching nuts, or the like, to a sheeted plate, usually a sheet metal and hereinafter referred to as the work piece. The nut feeding mechanism lies under the punch assembly during a part of the downward stroke thereof, but must be retracted as the punch assembly is moving downwardly, after it has grasped a nut. The nut feeding mechanism is returned to its initial position after the punch assembly has clinched the nut to the work piece.

Background of the invention

The mechanism disclosed herein is used in the Automated Press for Fasteners on which patent application Ser. No. 621,647 was filed on Mar. 8, 1967, in the names of Richard B. Ernest and Kenneth A. Swanstrom.

Brief summary of the invention

It is an object of this invention to provide a nut feeding mechanism which cooperates with a nut feeding track to supply nuts to a punch pilot, but which is retracted out from under the punch assembly's path of travel before the latter can engage, and damage, the nut feeding mechanism.

The foregoing and other objects of this invetnion, the principles of this invention, and the best mode in which I have contemplated applying such principles will more fully appear from the following description and accompanying drawings in illustration thereof.

In the drawings:

FIG. 3 is a top view of the gate assembly and the portion of the nut feeding track shown in FIG. 2;

Figure 1:
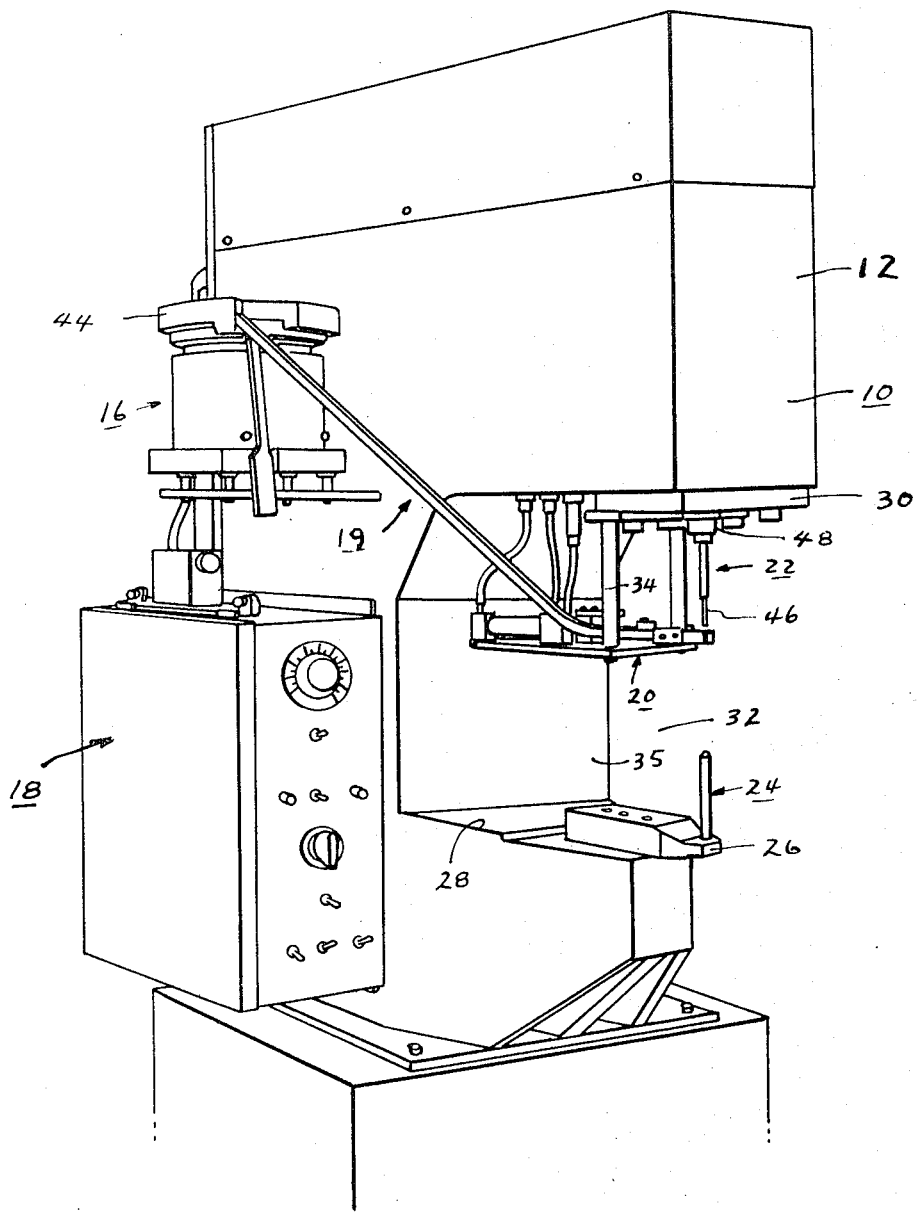
FIG. 1 is a front perspective view of the automated press having a nut feeding mechanism, or gate assembly, constructed in accordance with this invention.

FIGS. 4 and 5 are front and side views of the gate taken along the lines 4—4 and 5—5 in FIG. 3;

FIG. 6 is a partial, top enlarged view of the forward (left) end of the gate shown in FIG. 3;

FIG. 7 is a partial view of the press showing the gate assembly, punch assembly, and anvil assembly prior to initiation of a cycle;

FIG. 8 is a partial side view taken from the left hand side in FIG. 7;

FIG. 9 is a partial, mostly sectional, view of the leading end of the punch pilot shown in FIGS. 7 and 8;

FIGS. 10, 11 and 12 are side views taken on the same side as FIG. 8, but showing successive steps; and FIGS. 13, 14 and 15 are front views corresponding to FIGS. 10, 11 and 12, respectively;

Referring to FIG. 1, the press 10 comprises a generally upright frame 12 and includes a pneumatic and hydraulic circuit described in the aforementioned patent application. As illustrated, in FIG. 1, a fastener feed hopper assembly 16 is secured to one side of the frame 12, as is also an electrical control unit 18, the latter being also described in the aforementioned patent application.

The fastener feed hopper assembly 16 includes a track device 19 for delivery to the feeding mechanism, or gate assembly 20, a fastener 25, i.e., a nut or nut-like element, positioned below a punch assembly 22 which is, in turn, to be delivered by the punch assembly 22 to the work piece 23, FIGS. 1 and 8, but intended to rest upon an anvil assembly 24 carried by an anvil holder 26 which is suitably secured to the lower jaw 28 of the press, the gate 20 and the track 19 together forming a dispensing device.

The gate assembly 20 is suspended from the roof 30 of the mouth 32 of the press by columns 34 which are suitably secured to the roof 30, a rear wall 35 defining the back of the mouth 32.

To install a fastener upon the work piece 23, the work piece, with a suitable pre-punched hole, is placed upon the anvil assembly 24 so that the anvil nose 40 of the anvil pilot 42 extends through the hole in the work piece, as shown in FIGS. 7 and 8.

Assuming that the feed hopper bowl 44 has a supply of the nuts 25 to be inserted, and that the track device 19 and gate assembly 20 are full thereof, the cycle of the press is initiated by closing an electrical switch, not shown, whereupon the punch assembly advances under a low force and the punch pilot 46 grasps a nut. Thereafter, the gate 47 is retracted and the punch assembly 22 continues its downward stroke, carrying a nut to the work piece 23. Near the end of the downward stroke of the punch assembly 22, a higher force is applied to the ram 48, the lower end only of which is seen in FIG. 12, to clinch the nut to the work piece. Thereafter the punch assembly 22 is returned to the position shown in FIG. 8 and after the forward part of he punch pilot 46 has moved upwardly sufficiently, the gate 47 returns to its initial position.

Figure 2:
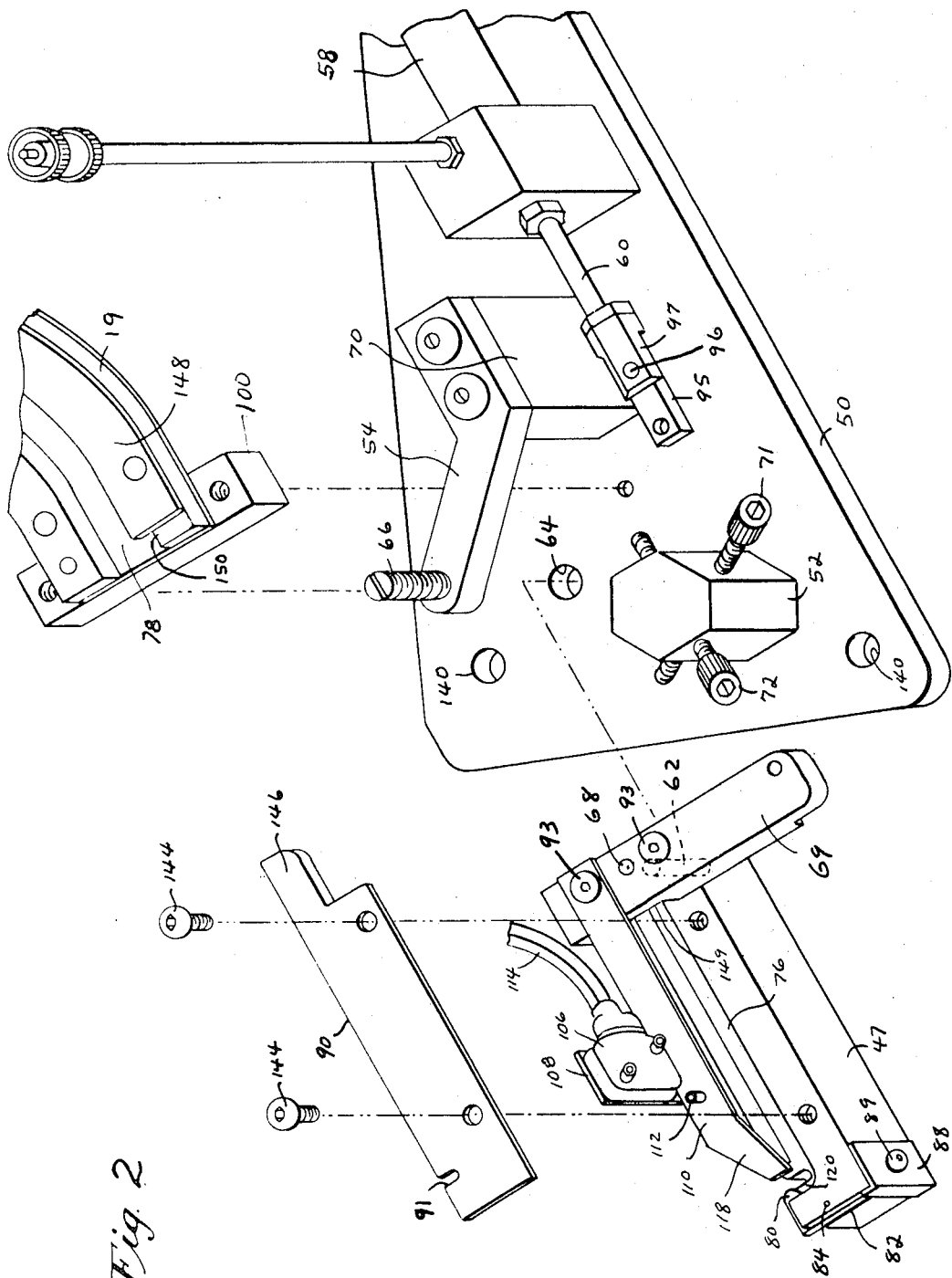
FIG. 2 is an exploded perspective view of the nut feeding mechanism, or gate assembly, and of a portion of the nut feed track.

Referring to FIGS. 2 and 10, the gate assembly 20 comprises a support plate 50 secured intermediate the anvil assembly 24 and the punch assembly 22 by the columns 34. The plate 50 supports the gate 47, a stop block 52, a fulcrum providing arm 54, and a cylinder 58. The gate 47 is pivoted by the rod 60 about a vertical axis defined by a pin 62, pressed into the gate 47 and extending slidably into a hole 64 in the plate 50, and a spring loaded ball device 66, the ball of which is received in a seat 68 (vertically aligned with the pin 62) formed in the cross arm 69, the spring loaded ball device 66 being carried by the arm 54 and the arm 54 being secured to a block 70 which is in turn secured to the plate 50.

The stop block 52 carries two stop screws 71 and 72 the ends of which limit the retracted and extended positions, respectively, of the gate 47 by engagement alternately with the gate 47 or the cross arm 69.

The gate 47 has a track or groove or nut receiving section 76, which when the gate is extended, is aligned with the groove 67 in the track device 19 to receive a supply of fasteners. When in operation, the groove 76 is full of nuts and, of course, when it retracts, it retracts with the nuts remaining in the groove 76, except for the nut into which the punch pilot 46 has entered which at this time leaves the gate 47.

The forward portion of the gate 47 includes a finger 80, carried in a slot 82, and pivotal about a pin 84, the finger 80, being biased clockwise, FIG. 6, so as to restrain the nut, by a compression spring 86 and limited in clockwise motion by a stop or clip 88 secured to the corner of the gate, as shown in FIGS. 2 and 3, by a screw 89.

The groove 76 is covered by a lid 90 having a suitable notch 91 to permit the punch pilot 46 to reach into the leading nut, the gate 47 having an aligned notch 92 (FIG. 8) into which the forward part of the pilot 47 extends.

The crossbar, 69 is secured to the gate 47, as shown, by suitable screws 93 and is pivotally secured to the rod 60 by a pin 94 extending into the lower end of the cross bar 69 (as seen in FIG. 3) and into a link 95 which is pivotally mounted by a spring pin 96 at the other end to a clevis 97 which is threaded to the left hand end of the rod 60 so as to make length adjustments, when desirable.

The forward end of the track device 19 is suitably secured to a spacer 100 which in turn is secured to the plate 50 so that the lower surface of the groove 78 is slightly above the lower surface of the groove 76 to facilitate the transfer of the nuts from one groove to another.

Further, the rear end wall of the gate 47, as viewed in FIG. 3, is slightly spaced from the track device 19 and its spacer 100, as shown in FIG. 3, and the lower portion is tapered, as shown at 102, to allow the gate 47 to pivotally retract without engaging the track device 19 or its spacer 100.

Referring to FIG. 2, a gate safety switch 106 is carried by the gate 47. The gate safety switch 106 is mounted on a plate 108 which is secured to one side of the gate 47. The switch 106 includes an actuator button 109, shown in FIGS. 10 and 13, which is held in its depressed position by a leaf 110 biased upwardly by a coil spring 111, FIG. 8, which is wrapped about a screw 112 which extends into the gate 47, the coil spring 111 biasing the leaf 110 upwardly against the head of the screw 112, the leaf being anchored at its right hand end to top of the cross bar 69 and bent upwardly. The switch 106 is connected to the electrical circuit by wires 114, as described in the aforementioned application.

The switch 106, when not actuated, has its contacts open. However, since the leaf 110 is biased upwardly by the coil spring wrapped about the screw 112, it normally maintains the switch actuator depressed, i.e., in its contacts closed position.

The purpose of the gate safety switch 106 is to prevent the punch and hydraulic piston ram 48 from damaging the gate 47, if the gate 47 does not pull away from punch assembly 22 in time. For example, if a nut jams in the gate while the pilot 46 is in the nut, or the operator has not connected the air pipes to the cyclinder 58, the gate 47 may not pull back when it is supposed to. If the gate 47 does not pull back from under the advancing punch, it may be damaged by the punch 116, especially if a high force is being applied by the punch.

If the gate 47 does not pull back, the safety switch 106 is arranged so that the advancing punch 116 will engage the leaf spring 110, at its forward portion 118, the leaf spring 110 will then move downwardly, releasing the switch actuator button 109, thus opening the electrical circuit to the solenoid (not shown) which controls the valve supplying air to retract the ram 48, whereupon the ram 48 retracts carrying with it the punch assembly 22 away from the gate 47, as further described in the aforementioned patent application.

Assuming the electrical circuit and the pneumatic-hydraulic circuit of the press to be in the position prior to starting a cycle, the track device 19 and the gate 47 to be full of nuts, when the operator closes the starting switch, the punch pilot 46 will move downwardly into a nut carried by the gate 47, FIGS. 10 and 13, the nut being prevented from escaping from the open, forward end 120 of the groove 76 by the spring biased finger 80, the groove end portion 120 being at a right angle to the length of the groove 76 to facilitate exit of the nut therefrom at the appropriate time.

After the pilot enters the nut and then the gate 47 retracts, the finger 80 pivots out of engagement with the nut and the nut is carried toward the anvil assembly 24, as shown in FIGS. 11, 12, 14 and 15, the nut being held on the punch pilot 46 by the spring 122.

The operator has previously placed the work piece 23 so that the nose 40 of the anvil pilot 42 extends through the hole in the work piece 23 which is to receive the nut and the nut is carried downwardly until its shank is within the hole in the work piece, the punch pilot 46 first engaging the anvil nose 40 and causing the punch pilot 46 to retract against the bias of its spring 124, because the punch pilot 46 is biased downwardly by the spring 124 which is weaker than the spring 126 which biases the anvil pilot 42 upwardly. When the punch pilot 46 engages the nose 40, the punch pilot 46 retracts (upwardly) until the face 128 of the punch 116 engages the top of the nut at which time the punch 116 moves the nut downwardly, the nut now depressing the nose 40 downwardly, i.e., the shank of the nut now replacing the nose 40 in the hole in the work piece. At approximately the time the nut engages the top surface of the work piece, the timing of the cycle is such that a high force is exerted by the ram 48 and the punch 116 which is required to clinch the nut to the work piece.

As shown in FIG. 9, the spring 122 carried by the punch pilot 46 extends through a hole in the nose of the punch pilot 46 and the latter has vertical grooves 130 on opposite sides into which portions of the spring collapse, the single piece spring 122 having end portions extending into the parts of the grooves surrounded by the forward portion of the punch 116 when the punch pilot is fully extended, as shown in FIG. 8, and the spring 122 having spring bowed portions which are bowed to a diameter greater than the diameter of the crests of the threads of the nut which is to be carried by the punch pilot from the gate to the work piece, so as to grasp the latter when the pilot 46 enters the nut. The outside diameter of the forward portion of the punch pilot 46 is, of course, somewhat less than the diameter across the crests of the threads in the nut, and the grooves in the punch pilot are made sufficiently deep so that the spring 122 may collapse sufficiently to facilitate the transfer of the nut to the work piece.

Preferably the lid 90 makes a sliding fit with the nuts as they move in the groove 76 and for this purpose the lid 90 may be provided with a depending portion 142 which fits into a part of the groove 76 to keep the nuts from trying to move up out of the groove, although the depth of the portion 142 is dependent on the height of the nuts to be installed. In some instances the underside of the lid could even be flush with the upper surface of the gate 47 to which it is secured by screws 144. Also, preferably the lid 90 has a rear portion 146, FIG. 2, which extends under the cross arm 69, in a suitable notch 149 therein, and the cover 148 of the track device 19 is cut back as at 150, so that the rear lid portion 146 overlaps the groove 78 and a part of the nut about to enter the groove 76, the overlapping increasing when the gate is retracted.

The rod 60 is connected to a piston (not shown) within the cylinder 58 and the piston is moved back and forth by air pressure supplied alternately to opposite ends of the cylinder to retract or return the gate 47.

In FIG. 2, the plate 50 is shown with holes 140 through which extend suitable screws to secure the plate 50 to the columns 34.

Also, the blocks 52 and 70 and the cylinder 58 are all suitably secured to the plate 50, the arm 54 being secured to the block 70, as shown.

From the foregoing it is seen that the forward end of the gate 47 is between the punch assembly and the anvil assembly at the beginning of the cycle, is retracted out from under the punch assembly during the downward stroke of the punch assembly, and is returned to its initial position after the front of the punch pilot clears the forward end of the gate during its return stroke.

In FIGS. 3, 4 and 5 the safety switch, leaf and related parts are omitted for illustration purposes. In FIGS. 3, 5 and 6 the lid 90 is cut back at its forward end for clarity. In FIGS. 11, 12, 14 and 15 the switch 106 is omitted and its mounting plate 108 is partially shown.

While the pilot spring 122 has been described in connection with the grasping of a nut having internal threads, it will be seen that the punch pilot 46 will function similarly with any nut, or insert-like element, so long as it may extend into a hole of the element.

Having described this invention, what we claim is:

1. A dispensing device for nuts or the like comprising
 a support member,
 a pivotal gate mounted on said support member,
 said gate being movable between extended and retracted positions,
 a track device having a track for supplying nuts or the like to said gate,
 said gate including a groove aligned with said track to receive said nuts or the like,
 means for pivoting said gate between said extended and retracted positions, and
 second means for retaining the leading nut or the like within said groove.

2. The structure recited in claim 1 wherein
 said gate includes a finger to restrain the leading nut or the like from leaving said section,
 said gate includes a slot within which said finger is mounted,
 said groove having an open forward end through which said nuts or the like may leave said gate, and
 said gate including spring means biasing said finger toward restraining engagement with said nut or the like.

3. The structure recited in claim 2 wherein said gate further includes a
 pin pivotally mounting said finger, and
 stop means for limiting movement of said finger in opposition to the force applied by said spring means.

4. The structure recited in claim 3 and further including a lid over a part of said groove to partially cover the nuts or the like so that the progress of some of the nuts or the like is visually observable.

5. The structure recited in claim 4 wherein said lid partially overlies said track also.

6. The dispensing device claimed in claim 1 in combination with a press, said press comprising a frame, a punch assembly, and an anvil assembly, said dispensing device being diposed in part between said punch assembly and said anvil assembly.

7. The structure recited in claim 6 wherein said gate has an opening through which a part of said punch assembly may extend.

References Cited

UNITED STATES PATENTS

| | | | |
|---|---|---|---|
| 3,108,368 | 10/1963 | Steward | 29—211 |
| 2,799,188 | 7/1957 | Newcomb | 29—34.2 |
| 2,652,942 | 9/1953 | Muchy | 29—34.2 |
| 2,746,065 | 5/1956 | Poupitch | 29—33.9 |

RICHARD H. EANES, Jr., *Primary Examiner.*

U.S. Cl. X.R.

29—33